United States Patent
Pola

(10) Patent No.: US 10,374,987 B2
(45) Date of Patent: Aug. 6, 2019

(54) ELECTRONIC NOTIFICATIONS OF USERS CONCURRENTLY INTERACTING WITH THE SAME FEED ITEM OF A SOCIAL NETWORK FEED

(71) Applicant: salesforce.com, inc., San Francisco, CA (US)

(72) Inventor: Peda Venkateswarlu Pola, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 475 days.

(21) Appl. No.: 14/645,248

(22) Filed: Mar. 11, 2015

(65) Prior Publication Data

US 2016/0269328 A1    Sep. 15, 2016

(51) Int. Cl.
*H04L 12/58*    (2006.01)
*H04L 29/08*    (2006.01)

(52) U.S. Cl.
CPC ............ *H04L 51/046* (2013.01); *H04L 51/32* (2013.01); *H04L 67/22* (2013.01); *H04L 67/26* (2013.01); *H04L 67/306* (2013.01)

(58) Field of Classification Search
CPC .... G06F 3/0481; G06F 3/04842; G06F 17/30; G06F 17/214; G06F 17/3053; G06F 17/30011; G06F 17/30528; G06F 17/30598; G06F 17/30699; G06F 17/30864; G06F 17/30867; G06F 17/30958; G06F 21/10; G06F 21/6218; G06Q 10/10; G06Q 10/107; G06Q 30/02; G06Q 30/016; G06Q 30/0201; G06Q 50/01; H04L 51/04; H04L 51/12; H04L 51/32; H04L 51/046; H04L 65/403; H04L 67/02; H04L 67/22; H04L 67/26; H04L 67/306; H04M 1/72555; H04W 4/21

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

U.S. Appl. No. 14/506,480, filed Oct. 3, 2014, Peda Venkateswarlu Pola.

(Continued)

*Primary Examiner* — Clayton R Williams
*Assistant Examiner* — Michael Li
(74) *Attorney, Agent, or Firm* — Weaver Austin Villeneuve & Sampson LLP

(57) ABSTRACT

Disclosed are examples of systems, apparatus, methods and computer program products for providing electronic notifications that users are concurrently interacting with the same feed item of a social network feed. In some implementations, first data from a first user system can identify a first feed item of the feed as one with which a first user is interacting. It can be determined that a second user using a second user system is concurrently interacting with the first feed item. Based on the determinations, a notification can be sent to one or both user systems. The notification can include data indicating that the first and second users are concurrently interacting with the first feed item.

19 Claims, 9 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0162877 A1* | 8/2004 | Van Dok ............... G06F 3/0481 709/204 |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0205541 A1* | 8/2010 | Rapaport ............... G06Q 10/10 715/753 |
| 2011/0218958 A1 | 9/2011 | Warshaysky et al. |
| 2011/0225170 A1* | 9/2011 | Obasanjo .......... G06F 17/30864 707/748 |
| 2011/0247051 A1 | 10/2011 | Bulumulla et al. |
| 2012/0005224 A1* | 1/2012 | Ahrens .................... H04W 4/21 707/769 |
| 2012/0042218 A1 | 2/2012 | Cinarkaya et al. |
| 2012/0221581 A1* | 8/2012 | Narayanan ............... H04W 4/21 707/748 |
| 2012/0223951 A1* | 9/2012 | Dunn ..................... G06Q 10/10 345/467 |
| 2012/0233137 A1 | 9/2012 | Jakobson et al. |
| 2012/0290407 A1 | 11/2012 | Hubbard et al. |
| 2012/0331067 A1* | 12/2012 | Richter .................. G06Q 50/01 709/206 |
| 2013/0212497 A1 | 8/2013 | Zelenko et al. |
| 2013/0218885 A1* | 8/2013 | Satyanarayanan ... G06Q 30/016 707/728 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0275401 A1* | 10/2013 | Auger ............... G06F 17/30011 707/704 |
| 2014/0101243 A1* | 4/2014 | Naveh .................... G06Q 50/01 709/204 |
| 2014/0214964 A1* | 7/2014 | Liyanage ................ H04L 51/32 709/205 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0098490 A1 | 4/2016 | Pola |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

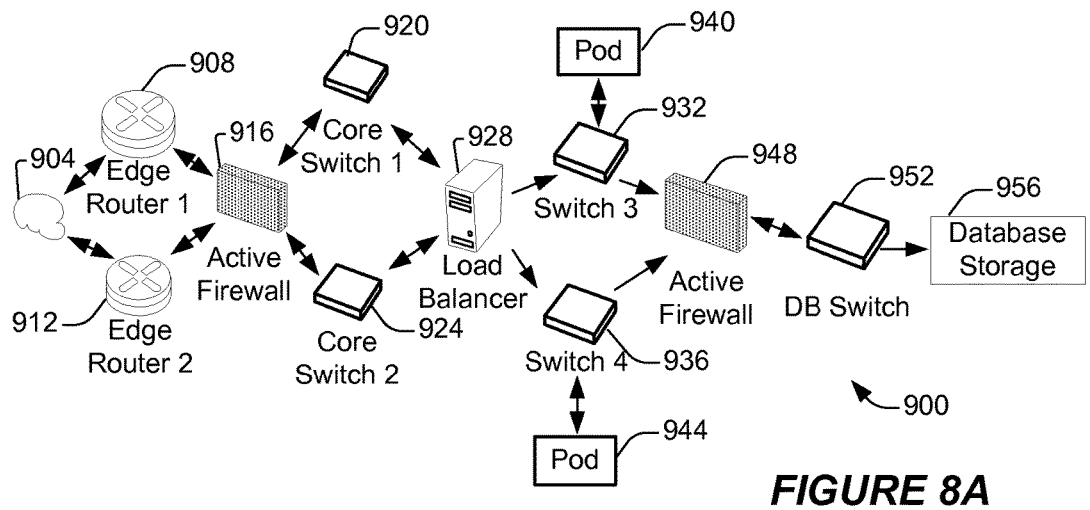
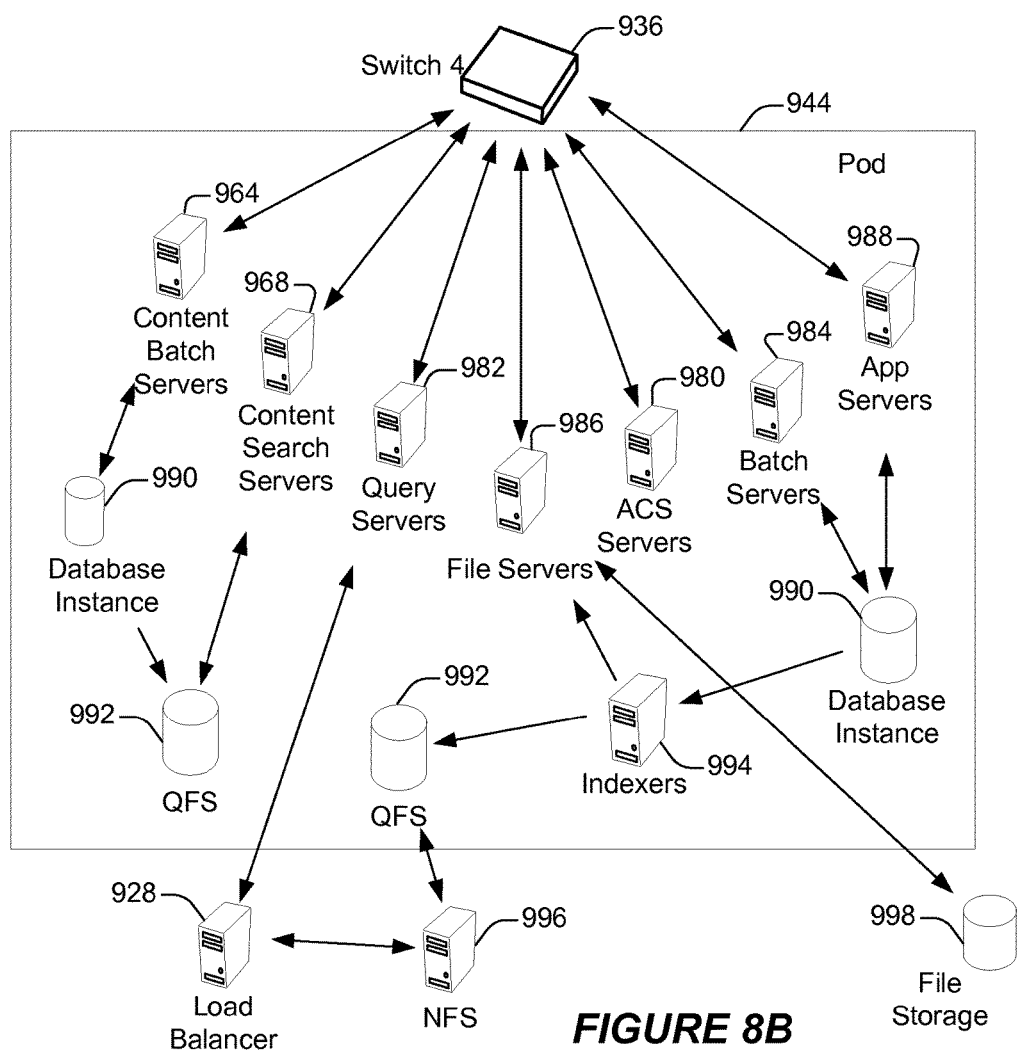
FIGURE 8A
FIGURE 8B

US 10,374,987 B2

ELECTRONIC NOTIFICATIONS OF USERS CONCURRENTLY INTERACTING WITH THE SAME FEED ITEM OF A SOCIAL NETWORK FEED

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to social network feeds. More specifically, this patent document discloses techniques for providing notifications of users concurrently interacting with the same feed item of a social network feed.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer techniques for providing notifications of users concurrently interacting with the same feed item of a social network feed. These drawings in no way limit any changes in form and detail that may be made by one skilled in the art without departing from the spirit and scope of the disclosed implementations.

FIG. 8A shows a system diagram of an example of architectural components of an on-demand database service environment 900, in accordance with some implementations.

FIG. 8B shows a system diagram further illustrating an example of architectural components of an on-demand database service environment, in accordance with some implementations.

DETAILED DESCRIPTION

Figure 1:
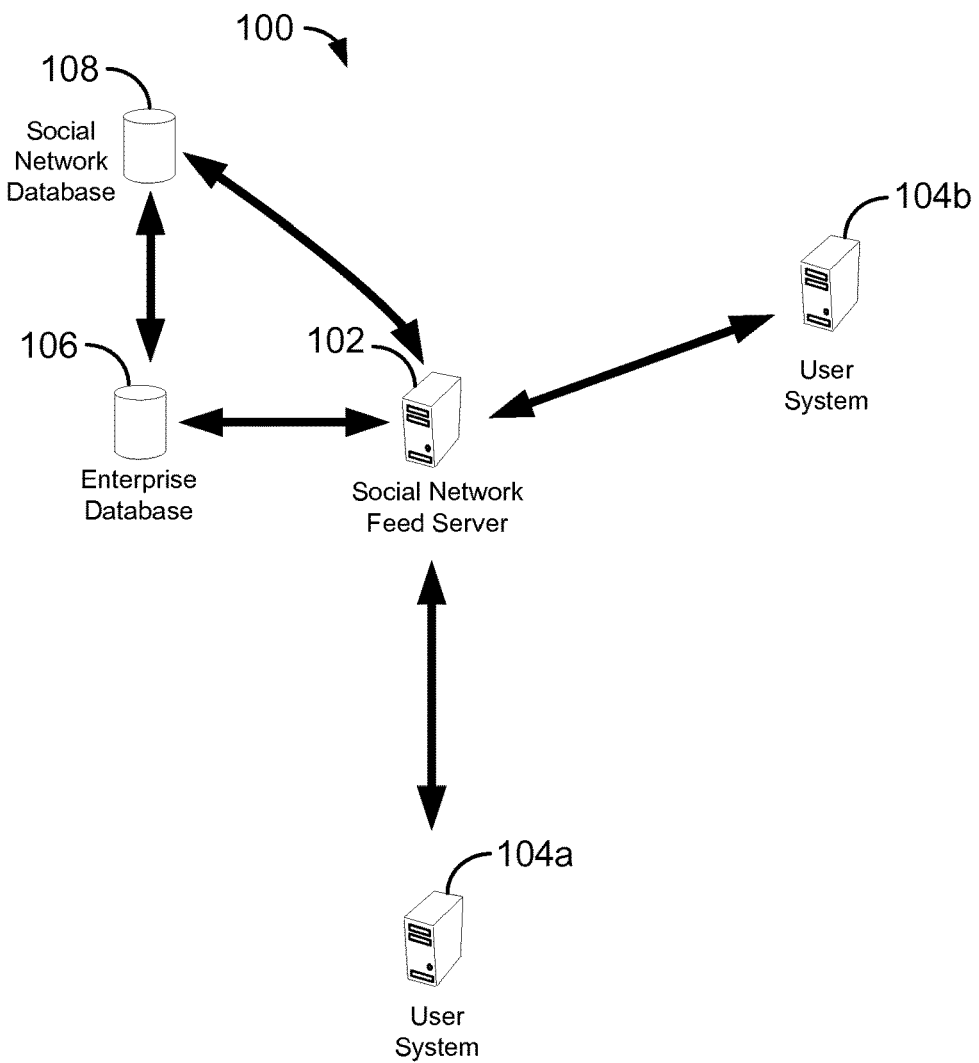
FIG. 1 shows a system diagram of an example of a database system 100 for providing notifications of users concurrently interacting with the same feed item of a social network feed, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing notifications that users are concurrently interacting with the same feed item of a social network feed.

In a conventional social network feed environment, users can interact with a feed item such as a post or comment in different ways. But at any given time, users often are unaware of who else may be interacting with the same feed item, resulting in inefficiencies and unnecessary redundancy. By way of illustration, Pham is an engineer at Sell Fast, a software company that specializes in cloud-based software for selling various items. Sell Fast has thousands of employees at various locations around the world. Pham, located in the United States, is part of a global team of engineers responsible for developing a new cloud-based application that is going to be implemented in the near future. As the deadline for completion of the application nears, Zed the project manager has some important questions that need to be answered immediately. As such, Zed publishes a post with a list of 8 questions to a group feed of a social network used by the team at Sell Fast. All of the engineers who are part of Pham's team, including Anna, an engineer living in India, are members of the group and thus receive updates to the group feed. Both Pham and Anna are very busy and are trying to complete their respective tasks to complete the application before the deadline. Pham and Anna notice the list of 8 questions in their social network feeds at about the same time, and both are capable of answering the questions. Anna starts her response immediately and Pham begins writing a similar response 5 minutes later. After 30 minutes have passed, and as Pham is about to complete and publish his response, he notices in the group feed that Anna has published a comment on Zed's post with nearly the same answers Pham spent the last 30 minutes typing. Living across the world from each other, Pham knew that Anna was perfectly capable of answering the questions but assumed that Anna was asleep and not working. Otherwise he would have not spent 30 minutes composing his response.

Some of the disclosed techniques can be implemented to generate electronic notifications to a first user that a second user is concurrently interacting with the same feed item with which the first user is interacting in a social network feed. By way of example, a graphical user interface (GUI) presenting a social network feed on a display of a user's smartphone, tablet, laptop, etc. can display a notification to the user that another user is interacting with the same feed item displayed in the GUI. In some implementations, the notification can display details of the interaction with the feed item. In an alternative scenario to that described above, as Pham is composing a response to the 8 questions, a pop-up window can be generated on his display screen to indicate Anna has viewed the feed item and/or is composing a response. For example, the notification can report: "Anna and Pham are viewing Zed's post", and/or "Anna is typing a response to Zed's post."

In another scenario of a conventional social network feed, both Pham and Anna could assume that each other is going to write the response to the 8 questions. Based on their assumptions, neither Pham nor Anna responds, and Zed does not get the answers he needs in a timely manner, creating a bottleneck in the team's productivity. On the other hand, implementing some of the disclosed notification techniques, both Pham and Anna can assume that appropriate notifications would be generated if another user had viewed or begun responding to a post. As such, if a notification to Pham indicates only that Anna has viewed the feed item, Pham can assume that she is not preparing a response and can proceed in typing his response. Additionally, Anna and Joel, another engineer on the team, can be informed by notifications on their displays that Pham is typing a response.

Some but not all of the techniques described or referenced herein are implemented using a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include updates presented as items or entries in the feed. Such a feed item can include a single update or a collection of individual updates. A feed item can include various types of data including character-based data, audio data, image data and/or video data. A social network feed can be displayed in a GUI on a display device such as the display of a computing device as described below. The updates can include various social network data from various sources and can be stored in an on-demand database service environment. In some implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Updates can include various types of updates, which may or may not be linked with a particular record. For example, updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of update that can be received and included in the user's news feed. Any number of users can follow a particular entity and thus view updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes updates and other feed items that are about the group as a whole, the group's purpose, the group's description, and group records and other objects stored in association with the group. Threads of updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a system diagram of an example of a database system 100 for providing notifications of users concurrently interacting with the same feed item of a social network feed, in accordance with some implementations. Database system 100 may provide communications to be transmitted among a variety of different hardware and/or software components. In FIG. 1, database system 100 includes a social network feed server 102, a user system 104a and a user system 104b, an enterprise database 106, and a social network database 108.

Social network feed server 102, or "feed server" 102, may communicate with all other components of database system 100. This communication may be facilitated through a combination of networks and interfaces. Feed server 102 can include one or many servers, and in alternative implementations can include some or all of enterprise database 106 and social network database 108. Also or alternatively, data stored in enterprise database 106 and social network database 108 can be arranged in tables on a shared database. Feed server 102 may act as a communication intermediary between user systems 104a and 104b and enterprise database 106 and social network database 108. For example, data sent to feed server 102 from user system 104a may be processed by feed server 102 and sent to one or both of enterprise database 106 and social network database 108. In addition, the data sent to feed server 102 can include data identifying the user, a feed item with which the user is interacting, and a type of interaction the user is having with the feed item. Using such feed interaction identification data from various user systems, feed server 102 can determine if two or more user systems are concurrently interacting with the same feed item.

A user system 104a or 104b may be any type of computing device which can communicate via one or more data networks with a server, and can display a social network feed in a user interface. For example, user systems 104a and 104b may be portable electronic devices such as smartphones, tablets, laptops, wearable devices such as Google Glass®, other optical head-mounted display (OHMD) devices, smart watches, etc. In some instances, user systems 104a and 104b may be another server or a desktop computer operated by a user. Additionally, user systems 104a and 104b may be different types of computing devices. For example, user system 104a may be a desktop computer whereas user system 104b may be a smartphone.

Enterprise database 106 can be part of a multitenant database system and can be configured to transmit data to and from feed server 102. In some implementations, user system 104a can access enterprise database 106 through a request made by feed server 102. Also or alternatively, feed server 102 can access enterprise database 106 without a request from user system 104a. Enterprise database 106 can store and maintain database records of an organization in an enterprise system such as CRM records in the form of accounts, opportunities, leads, cases, contacts, contracts, campaigns, solutions, quotes, purchase orders, etc. The records can be hierarchically arranged in enterprise database 106 with some data objects identifying relationships between the records. In addition, enterprise database 106 can receive requests from feed server 102 including, but not limited to a query, a request to create a new record, and or a request to modify an existing record. Enterprise database 106 and social network database 108 can reciprocally communicate with each other to create records or modify records on one or both databases.

Social network database 108 can store user profiles, feed items, data objects identifying particular feeds, and various metadata. For example, updates occurring within an enterprise system can be stored as feed items with a dependency relationship to one or more social network feeds. Also, social network database 108 can store feed interaction identification data processed by feed server 102. The feed interaction identification data can include data indicating whether a user has been or is currently beginning to interact with a particular feed item and can include metadata associated with the interaction.

Figure 2:
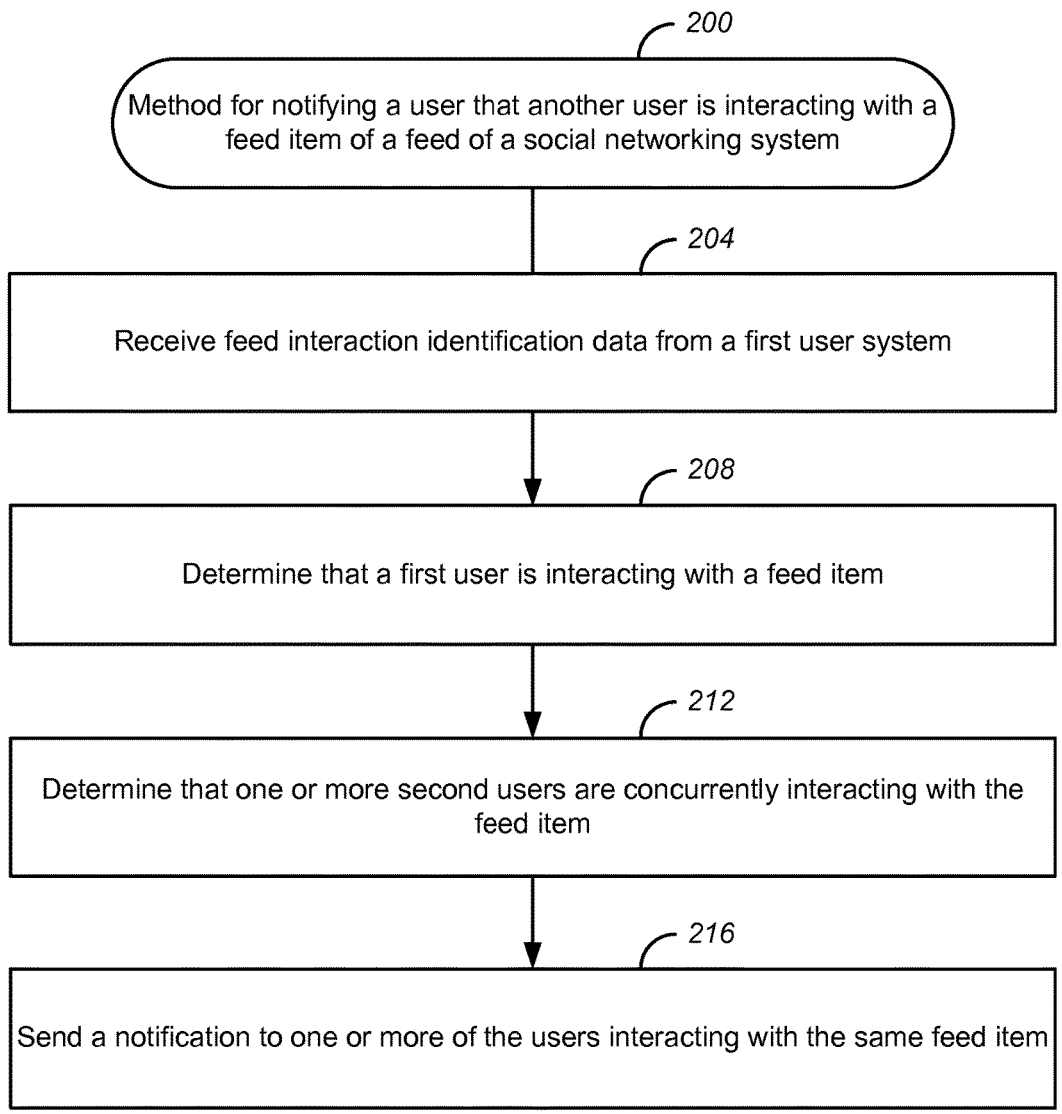
FIG. 2 shows a flow chart of an example of a method 200 for notifying a user that another user is interacting with a feed item of a feed of a social networking system associated with a database system, in accordance with some implementations.

FIG. 2 shows a flow chart of an example of a method 200 for notifying a user that another user is interacting with a feed item of a feed of a social networking system associated with a database system, in accordance with some implementations. Method 200 and other methods described herein may be implemented using the database system 100 of FIG. 1, although the implementations of such methods are not limited to database system 100.

In block 204 of FIG. 2, feed interaction identification data as described above is received at feed server 102 of database system 100 from a first user system, such as user system 104a of FIG. 1. For example, a user can access a page displaying a feed. As feed items appear in a user interface presenting the feed on the first user system, feed interaction identification data indicating that the user is viewing a particular feed item and, thus, has begun interacting with the feed item, can be generated. Also or alternatively, feed interaction identification data can be generated to indicate that a user has taken an affirmative act to start interacting with a feed item. For example, a user may hover a mouse pointer over the feed item in the user interface, click a "like" selection, or start to type text in a comment area to respond to a feed item such as a post. A user system can send such feed interaction identification data to a server implementing part or all of the blocks of method 200 continuously or at specified intervals. The feed interaction identification data can include metadata to identify the specific actions taken by or initiated by a user to create, delete or modify data stored on a database such as enterprise database 106 or social network database 108 of FIG. 1.

Figure 4:
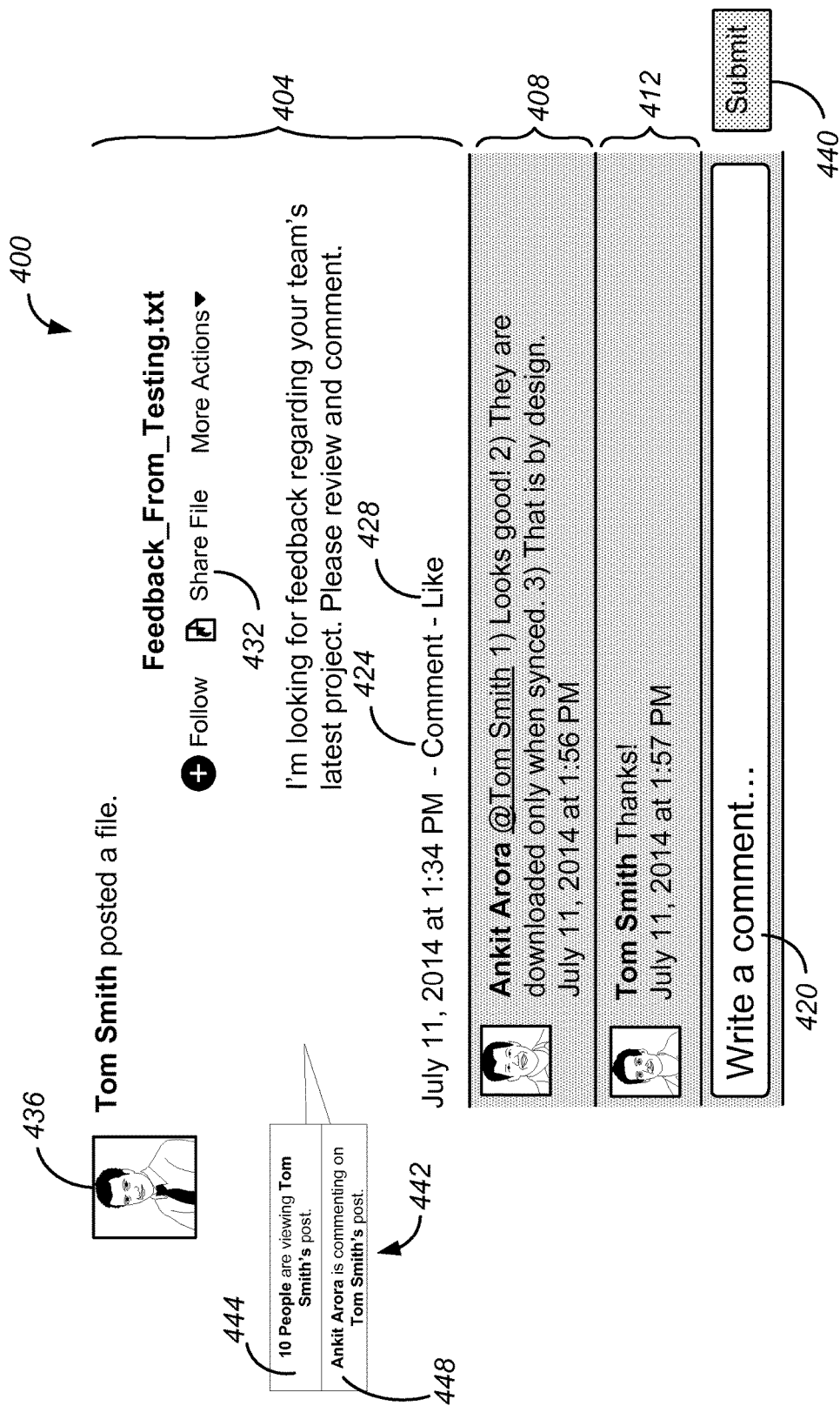
FIG. 4 shows an example of a user interface 400 with a feed item of a social network feed in the form of a graphical user interface (GUI) as displayed on a computing device, in accordance with some implementations.

FIG. 4 shows an example of a user interface 400 with a feed item of a social network feed in the form of a GUI as displayed on a computing device, in accordance with some implementations. In this example, displayed feed items of the feed include a post 404 created by a user 436 and comments 408 and 412 submitted by other users in response to post 404. In some implementations, a feed item can encompass the post and the comments in response to the post. Comments 408 and 412 can be arranged hierarchically in relation to post 404 and stored in a database such as social network database 108 of FIG. 1. In some implementations, database tables can be maintained to include feed item IDs identifying particular feed items with which a user is interacting and user IDs of users who are interacting with a given feed item.

Figure 6:
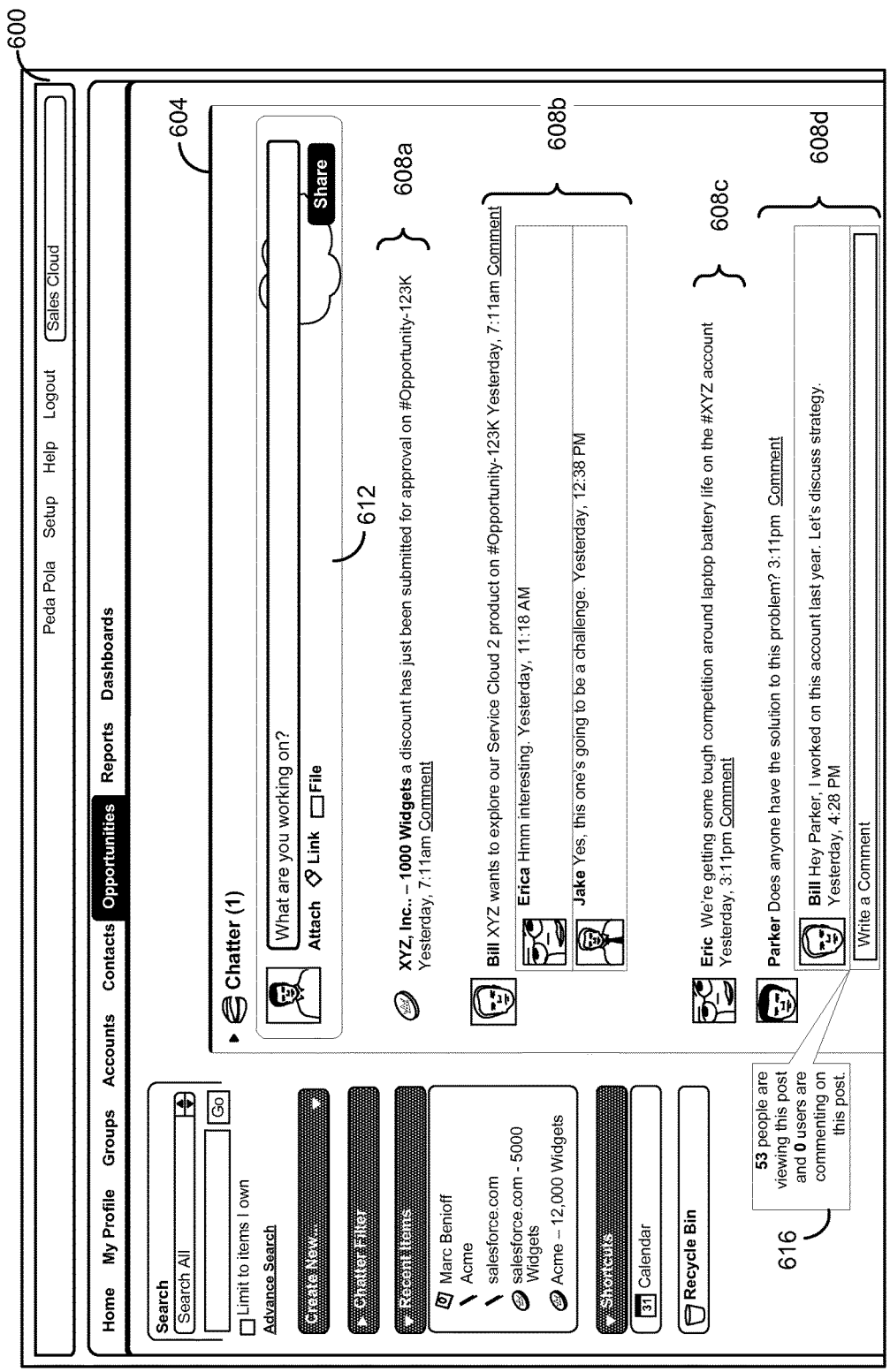
FIG. 6 shows an example of a user interface 600 with a social network feed in the form of a GUI as displayed on a computing device, in accordance with some implementations.

FIG. 6 shows an example of a user interface 600 with a social network feed with notifications in the form of a GUI as displayed on a computing device, in accordance with some implementations. User interface 600 includes social network feed 604 and feed items 608a, 608b, 608c, and 608d. In this example, a user has begun interacting with feed item 608d by clicking in a "Write a Comment" box displayed in conjunction with feed item 608d. Feed interaction identification data can be generated to identify this interaction including a timestamp of when a user first started interacting with feed item 608d by clicking on or in feed item 608d, any user input such as text entered in a comment box, a user ID of the user interacting with item 608d, and a feed item ID uniquely identifying feed item 608d in a database system.

Returning to FIG. 2, in block 208, it is determined that the first user is interacting with a feed item. In some implementations, the feed interaction identification data received in block 204 can be processed to identify the timestamp of when the user first started interacting with feed item 608d, any user input, the user ID, and the feed item ID. For example, returning to FIG. 1, feed server 102 may submit the received user ID and feed item ID as queries to a database or databases storing tables of user IDs and feed item IDs. In addition, the feed server can store the feed interaction identification data received in block 204 in a database with pointers or links to the particular user ID and/or feed item ID. Thus, a request by the feed server to the social network database could determine at any given whether and how many users are interacting with a feed item at a given time.

Returning to FIG. 4, a user could initiate an interaction with post 404 or with comments 408 and 412 by hovering a mouse pointer over or clicking in a comment area 420. This initiation can cause the user's device to send feed interaction identification data as described above to a feed server. The user can also input text, delete text, or in any other way modify text in comment area 420 with keystrokes from a keyboard. In some implementations, each keystroke can be communicated as feed interaction identification data to indicate that the user has started interacting with the feed item and continuously update the feed server to inform the server that the user is still interacting with the feed item. In some other implementations, even though a user has selected the comment area, feed interaction identification data is not sent to the feed server until the user has started inputting text in the comment area.

In some other implementations, interaction with a social network publisher 612 of FIG. 6 can cause feed interaction identification data to be communicated to a feed server. For example, a user hovering a mouse pointer over the "What are you working on?" field, clicking on an "attach" selection, a "link" selection or a "file" selection in publisher 612 can cause data identifying such an interaction to be immediately transmitted to a feed server to inform the server that a user is interacting with a feed item. Returning to FIG. 4, hovering a pointer over or clicking on a comment button 424, a like button 428, or a share file button 432 can also be communicated as feed interaction identification data to a feed server, where at block 208 of FIG. 2 the feed server determines that an interaction has commenced or is in progress. With comment button 424 of FIG. 4, a notification can then be generated and displayed to any users viewing the feed item of interest to indicate that the user has viewed the feed item and has begun commenting on the feed item. In some implementations, selection of a submit button 440 is communicated to the feed server to allow the server to determine that an interaction such as commenting has stopped.

Returning to FIG. 2, in block 208, a determination that a user is interacting with a feed item can be done in near real time, in some implementations. For example, near real time determinations can be made with a line of communication that temporarily opens between the feed server and a user's device immediately upon the user interacting with a feed item as explained above. Selecting submit button 440 of FIG. 4, in some but not all implementations, can cause the connection to close. Alternatively, near real time determinations can be made by a persistent communication link between the feed server and a user's device. The persistent connection allows the feed server to constantly monitor the activity of the user and make determinations immediately in response to user actions.

In some implementations, while a user moves his mouse pointer within his user interface, coordinates of the pointer can be derived by the user's device and/or the feed server.

Based upon the derived coordinates, at block 208 of FIG. 2, a determination that the user is interacting with one or more feed items may be made. In another example, the feed server or user's device can determine that a user has had post 404 of FIG. 4 located in a central region of a user interface for at least a threshold amount of time, allowing a determination to be made that the user viewed and is thus interacting with post 404. Additionally, scrolling up or down in a page to change post 404 from being centrally located or moving a mouse pointer away from post 404 for some threshold amount of time can be communicated to the feed server to indicate that the user is no longer currently viewing and/or no longer interacting with the feed item. Also or alternatively, a user can select publisher 612 of FIG. 6 to input text to comment on a feed item, and mouse cursor coordinates previously gathered can be used to accurately determine which feed item is being commented on.

In some implementations, the feed server can identify different types of interactions with a feed item. For example, the user may only view a feed item by having the feed item displayed in the user's user interface. Another type of interaction is when the user comments on a feed item. Alternatively, a user can complete a comment or cease creating the comment for a particular duration, indicating that the interaction has been completed. Accessing another page in which the feed item is not displayed can also be interpreted as completion of the interaction. In such cases, the type of interaction such as a view, comment, termination of user input, or loading of another page can be communicated as feed interaction identification data or included metadata to the feed server.

Using the techniques described above, a feed server can process and update determined interactions with multiple feed items by various users. For example, in FIG. 6, a server can determine that the user has commented on feed item 608*a*, and the server can determine that the user has commented on feed item 608*d*.

Figure 5:
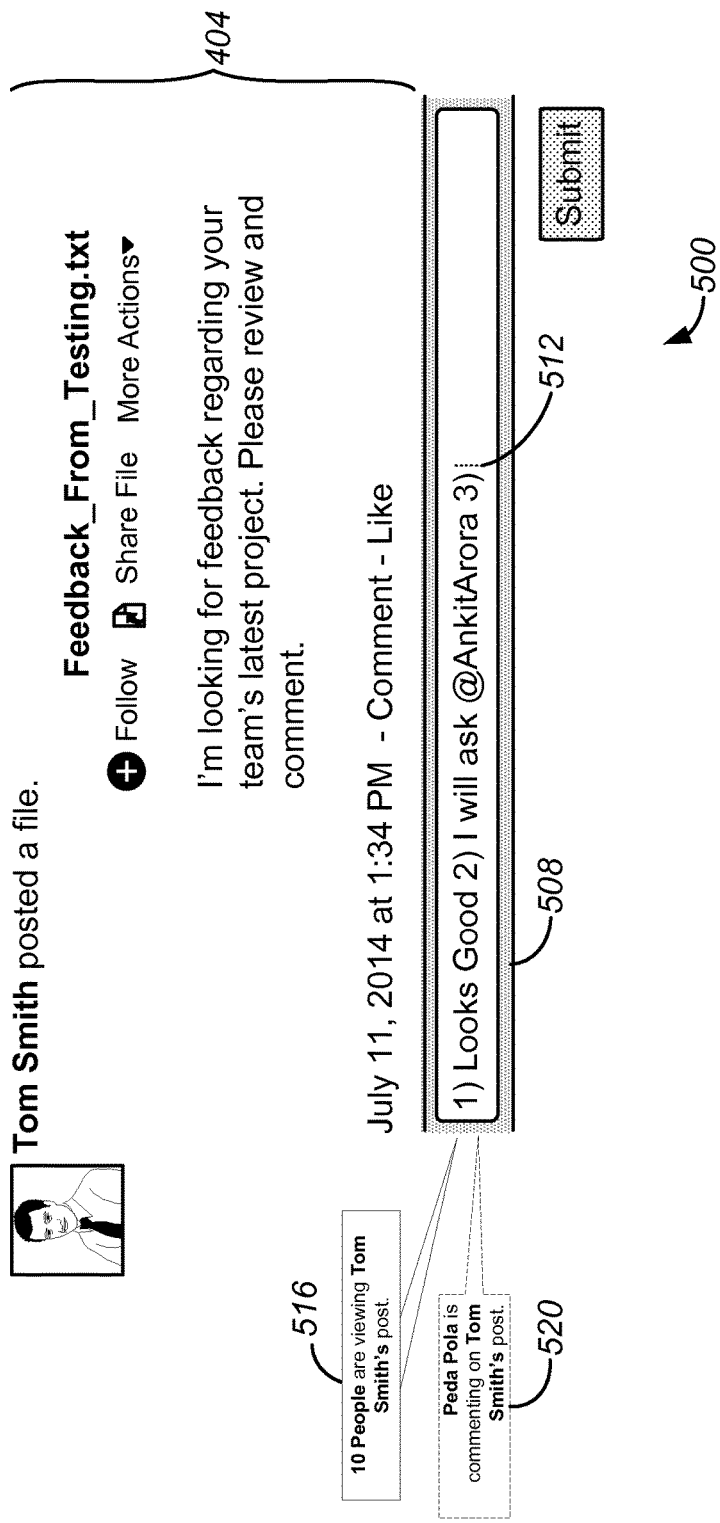
FIG. 5 shows an example of a user interface 500 with a social network feed and notifications in the form of a GUI as displayed on a computing device, in accordance with some implementations.

FIG. 5 shows an example of a user interface 500 with a social network feed with notifications in the form of a GUI as displayed on a computing device, in accordance with some implementations. A comment area 508 shows text input by a user in response to a post 504, as well as cursor 512 positioned at the end of the text in comment area 508. In some implementations, the number of characters or words entered in comment area 508 can be communicated as feed interaction identification data or as metadata of the feed interaction identification data. A feed server can compare this numerical data with a threshold to determine that a sufficient amount of user input has been received to conclude that a user is interacting with post 504. In this example, cursor 512 is a flashing or blinking text cursor in comment area 508. In some implementations, duration between user actions within a user interface can be communicated as feed interaction identification data or included metadata for a server to determine when a user is interacting with a feed item in block 208 of FIG. 2. For example, a duration of 5 seconds between a user selecting comment area 508 of FIG. 5 and beginning to type in comment area 508 could be communicated. Also or alternatively, a monitored duration can be reset depending on the type of user action, for example, the user navigating to another page from user interface 500.

Returning to FIG. 2, in block 212, it is determined that a second user is concurrently interacting with the same feed item of block 208. For example, a server can maintain a list of users who are identified as concurrently interacting with the same feed item. The list can be in the form of a database table of user IDs stored in an appropriate database, where the list references a given feed item. The list is updated as user devices indicate to the server that a user is interacting with or is no longer interacting with the feed item. For example, when the second user has begun viewing, commenting, or otherwise interacting with the feed item, the second user's device can send a message to convey this status information to the server, where the message identifies the second user by user ID and identifies the feed item with which the second user interacting by a feed item ID. Also or alternatively, a server can be configured to ping, at sufficiently frequent intervals, devices of users who have accessed the social networking system for status information of which feed item a given user is interacting with. A server can thus appropriately add user IDs to a concurrent interaction list with respect to a given feed item for the purpose of determining which users are concurrently interacting with the same feed item.

By the same token, in block 212, a user can be removed from a concurrent interaction list when data sent from the user's device to the server indicates that the user is no longer interacting with the associated feed item. For example, when a user clicks on, hovers a mouse pointer over, or begins commenting on a different feed item of the feed, the user can be removed from the list. In some implementations, a user submitting a response to a feed item associated with a concurrent interaction list, such as the user liking a post or submitting a comment on a post by clicking a "share" or "publish" button in a user interface, can cause that user to be removed from the concurrent interaction list. That is, the clicking of "share" by a user can be communicated to a server, and the server can process the action to determine that the first user is no longer interacting with the feed item. In some implementations, multiple user interactions can be processed as factors to determine whether a user is no longer interacting with a feed item. For example, the system can be configured to remove a user from a concurrent interaction list after the user has both shared a comment on the post and hovered a mouse pointer over a different post.

In some implementations, the system is configured to account for user idle time when maintaining a concurrent interaction list or otherwise monitoring user activity to determine whether users are concurrently interacting with the same feed item. For example, a system administrator can set a time threshold of 5 minutes of idle time. A first user begins to interact with a feed item, for instance, by beginning to type a comment in a comment box, but does not share the comment and enters no further user input for 6 minutes. Only after the 5-minute threshold is exceeded, this condition is communicated to the server, causing the server to then determine that the first user is no longer interacting with the feed item and thus remove the user from the concurrent interaction list. The time threshold can be configurable by a system administrator to be on the order of seconds, minutes, hours, etc. as desired for a particular implementation.

In some implementations, independent of any idle time monitoring as described above, an interaction by a second user can be determined to be "concurrent" with that of a first user when the interactions occur within a designated timeframe. For instance, a time threshold of 5 minutes is specified. If a first user begins interacting with a feed item, and a second user begins interacting with the same feed item less than 5 minutes after the first user began interacting with the feed item, an appropriate notification is displayed to inform one or both users that they are interacting with the same feed item. A server can receive and compare timestamps of users' interactions for this purpose. For example, if one user begins interacting with a feed item at 10:01 am, and another user begins interacting with the same feed item at 10:02 am, then a server could determine that these interactions fall within the 5-minute time threshold and are thus sufficiently "concurrent" to cause appropriate notifications to be generated and displayed.

It should be appreciated that some implementations of the disclosed systems are capable of monitoring many users interacting with the same feed item at the same time and communicating appropriate notifications. As each additional user starts interacting with the same feed item, essentially the same determination of block 212 is made in near real time. Some or all of the techniques described above for determining that the first user is interacting with a feed item block 208 can be practiced to implement block 212. In such cases, and as discussed in further detail below, where more than one user is interacting with the same feed item, a notification in a user interface can indicate that another user is concurrently interacting with the same feed item.

In block 216, a notification is sent to users concurrently interacting with the same feed item. Such a notification can be generated and displayed in a user interface on devices of the appropriate users. For example, FIG. 4 shows a notification in the form of a pop-up window 442 displayed adjacent to and graphically linked with post 404. The pop-up window 442 informs a user viewing user interface 400 that other users are concurrently interacting with post 404. Post metadata 444 included in pop-up window 442 indicates the number of users viewing post 404, and post metadata 448 indicates that another user is in the process of preparing a comment on post 404. In some implementations, metadata in the notification can be formatted with rich text and can include hyperlinks to other documents or pages, so a user can quickly click through the metadata to access details represented by the metadata. For example, a hyperlink to a user's profile of a user who is interacting with a given feed item may be clicked by another user to learn more about the user who is commenting on a post. In some implementations, a notification such as pop-up window 442 or a similar pop-up window 616 in FIG. 6 can be refreshed in near real time to indicate whether a concurrent interaction is still occurring, how users are interacting, and past interactions with a given feed item. For example, a notification 516 of FIG. 5 can be initially displayed to indicate, "10 People are viewing Tom Smith's post." After some amount of time, refreshed notification 520 can be displayed to indicate, "Peda Pola is commenting on Tom Smith's post." In some implementations, both notifications 516 and 520 may be displayed to separately inform how many other users are viewing a feed item and how many/which users are commenting on a feed item. In some other implementations, only notification 516 or 520 is displayed at a given time. In other implementations, notifications 516 and 520 can be displayed as new feed items in a feed.

Also or alternatively, a notification as described above can cause an instant messaging system to be activated or accessed, so instant messages can be sent between users interacting with the same feed item. In this way, for example, one user could quickly connect with another user and discuss who is going to respond to a given post to avoid redundancy and save time. In some implementations, an instant message may automatically be generated that includes content describing the first feed item. For example, some or all of the metadata displayed in pop-up window 442 of FIG. 4 could automatically be sent via an instant message from a user viewing user interface 400 to the user, Ankit Arora. Ankit could respond with an instant message telling the user to refrain from commenting and/or proceed with a different task.

Figure 3:
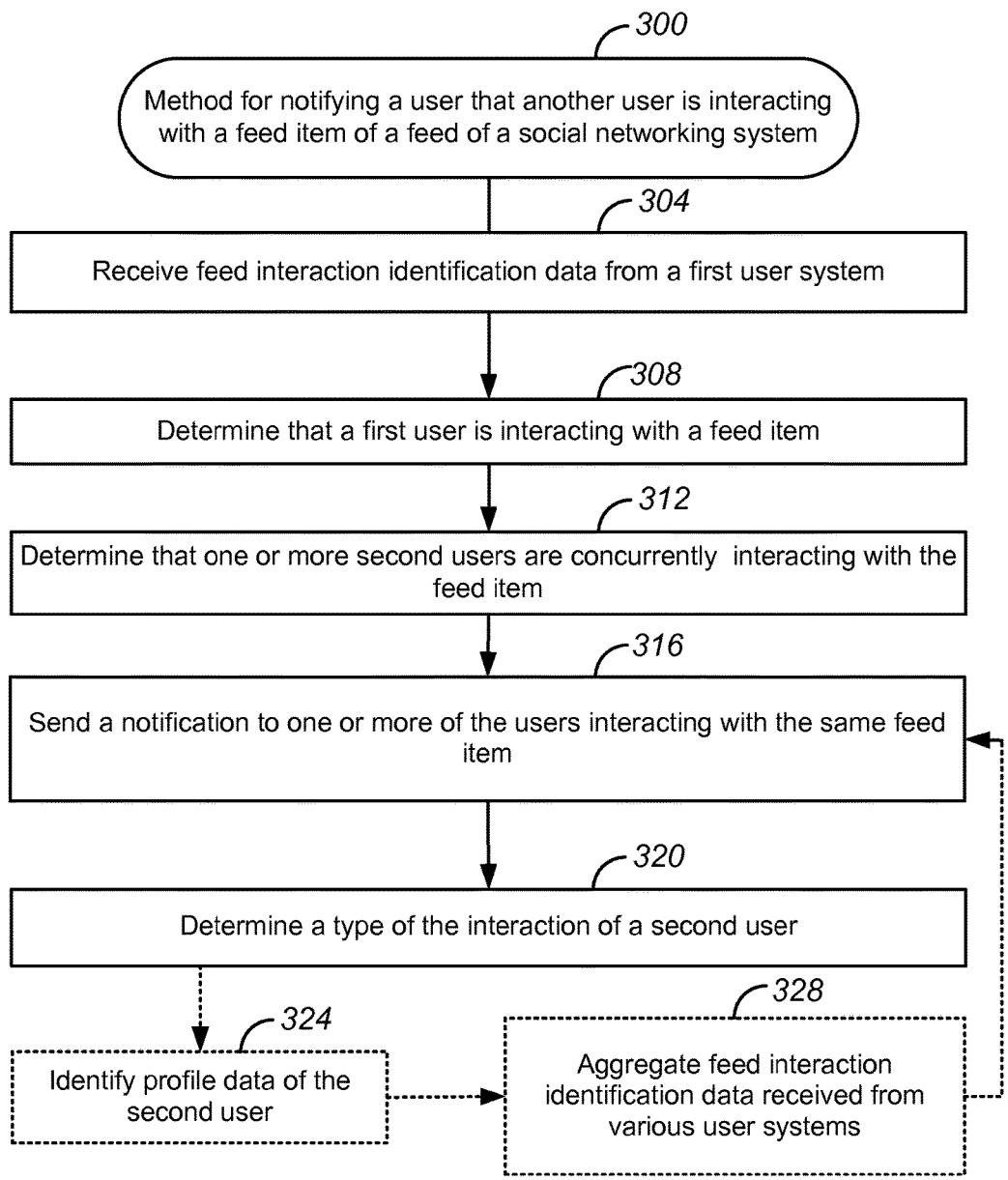
FIG. 3 shows a flow chart of an example of a method 300 for notifying a user that another user is interacting with a feed item of a feed of a social networking system, in accordance with some implementations.

FIG. 3 shows a flow chart of an example of a method 300 for notifying a user that another user is interacting with a feed item of a feed of a social networking system, in accordance with some implementations. Blocks 304-316 of FIG. 3 are similar to blocks 204-216 of FIG. 2, as described above. Following block 316, in block 320, a type of the second user's interaction is determined. In some implementations, a type of interaction can be a viewing, commenting, liking, or some other category of user feedback on a post. For example, in FIG. 4, post metadata 444 can include the "viewing" type for the 10 people viewing Tom Smith's post. By the same token, post metadata 448 indicates that "commenting" is the type of interaction by Ankit Arora. In another example, a notification could include metadata summarizing past interactions such as "10 users viewed the post" and "5 users commented on the post."

Returning to FIG. 3, in block 324, profile data of a user is identified. In some implementations, profile data of two or more users can be used by a server to identify relationships between the users. The relationships can reflect roles such as upper management, mid-level management, president, vice-president, team manager, team member, support staff, etc. within a management hierarchy of an organization. In addition, based on an identified relationship between users, a priority for interacting with a feed item can be determined. A server could then suspend or terminate an interaction by one or more users of lower priority. The suspension or termination of a user's interaction can be indicated with an appropriate communication, such as a pop-up window in a user interface, a post, an email, etc. For example, a manager and the manager's employee may be composing comments on the same feed item, which can automatically cause the employee's commenting functionality on the feed item to be blocked until the manager has shared her comment on a feed for viewing by the employee.

Also or alternatively, when two or more users are interacting with the same feed item, an interrupt request can be sent from a user to a server or to one or more other users. In some implementations, it is determined whether a user is authorized to request an interruption before the request is sent. If the user is authorized, then the interrupt request can be configured to automatically suspend or terminate other users' interactions upon receipt and processing by a server. In some other implementations, the interrupt request is no more than a request, and the request can be dismissed by other users. By way of illustration, the interrupt request can be delivered in a user interface as part of a notification that flashes or blinks until the interrupt request is affirmatively addressed.

In block 328, feed interaction identification data received from a plurality of user systems as described above, for instance, with reference to block 204 of FIG. 2, is aggregated, for instance, to identify how many users are interacting with the same feed item, the identities of those users, the types of their interactions, and other metadata of interest. The aggregated data may be displayed in an updated notification, which is refreshed automatically or in near real time after the feed server has completed processing the aggregation. In some implementations, feed interaction identification data can be aggregated and compiled into a report, which could be displayed as part of a dashboard in a user interface. The dashboard can include metrics and analysis of the aggregated data as part of a visual presentation in the user interface of a user.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 7A:
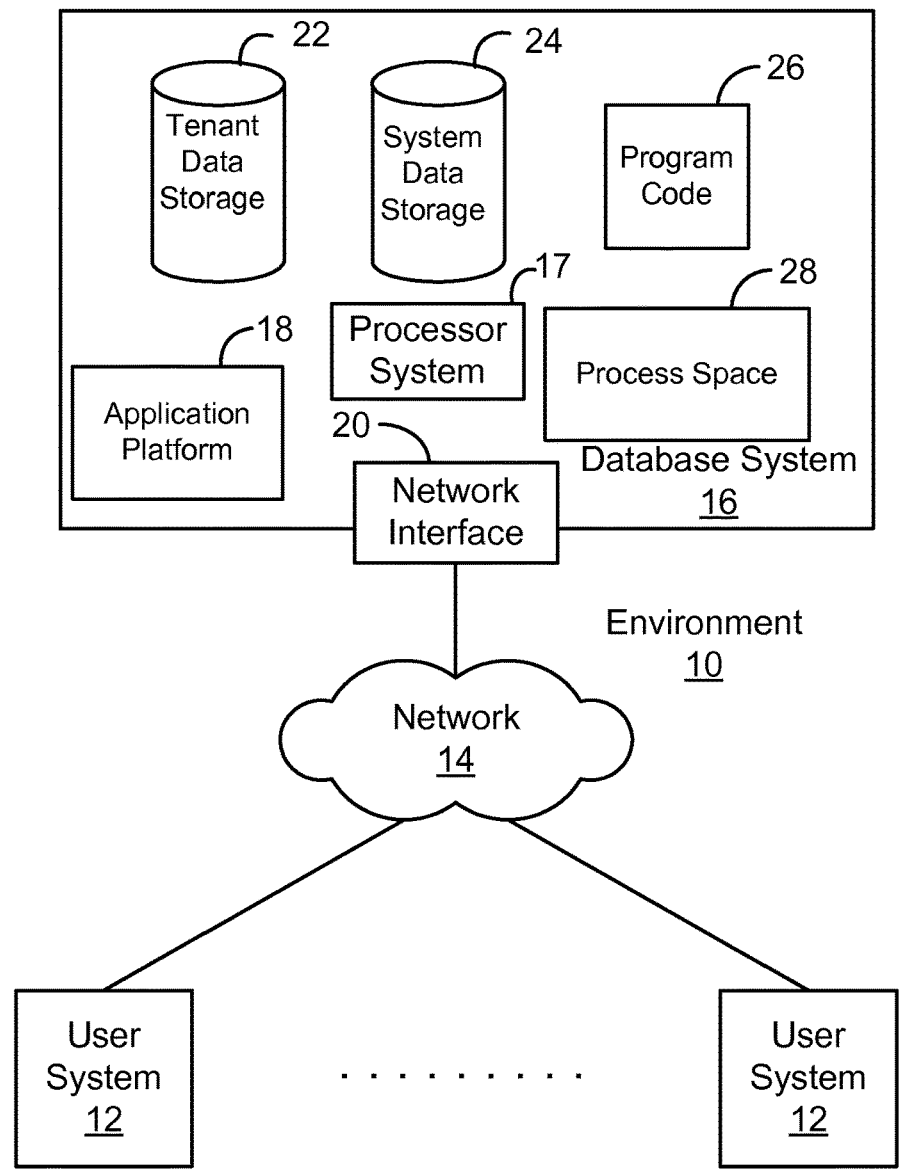
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
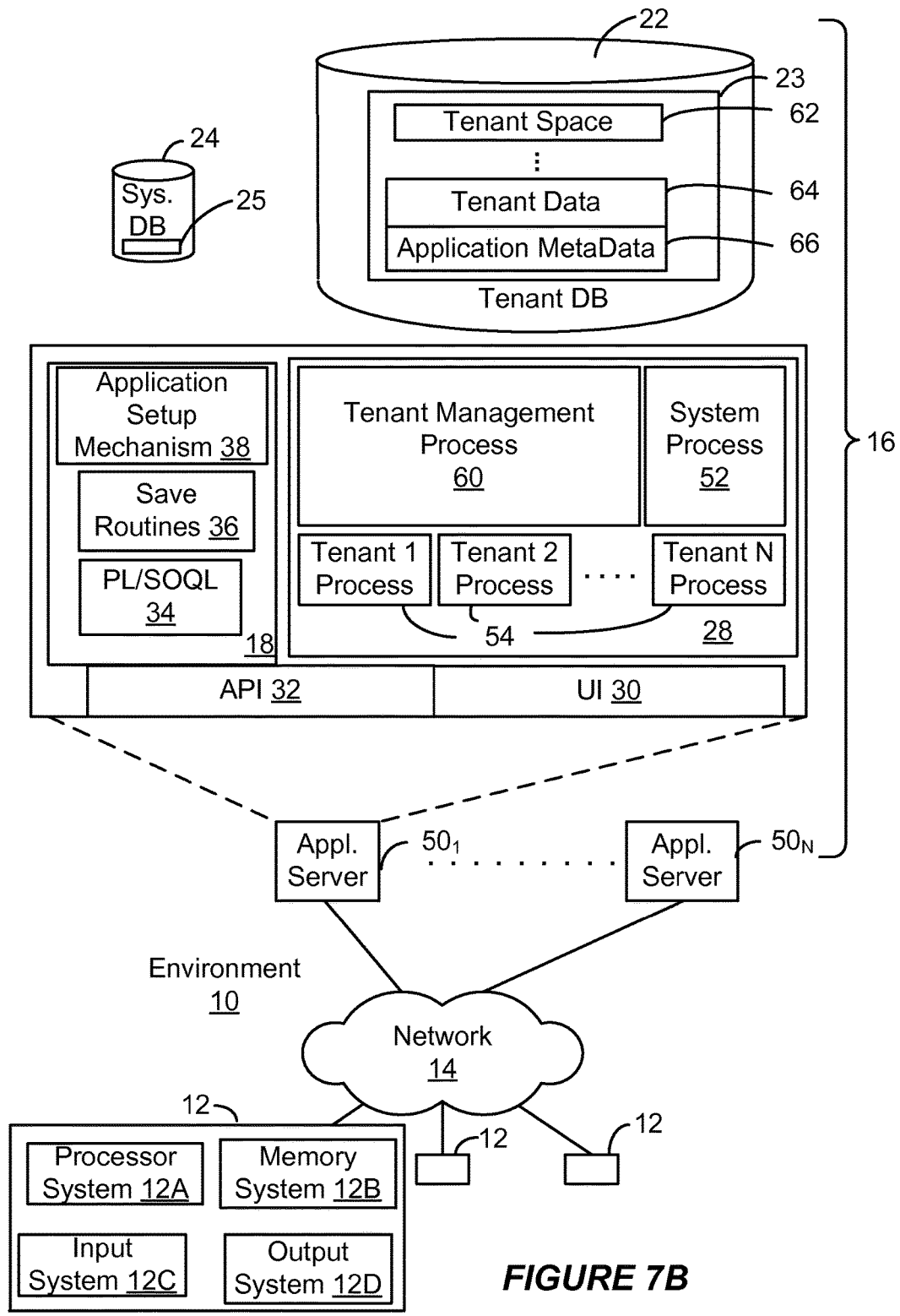
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for notifying a user that other users of a social networking system are interacting with a feed item of a feed of the social networking system, the system comprising:
    a database system implemented using a server system comprising at least one hardware processor, the database system configurable to cause:
        processing first interaction data received from a first user system of a first user, the first interaction data indicating that the first user has begun composing a first response to a first feed item of the feed of the social networking system using a first user interface on a first display device of the first user system;
        determining that a second user using a second user system has begun composing a second response to the first feed item;
        determining that the second user has not yet shared on the feed the second response being composed; and
        displaying, responsive to the determinations, a notification in the first user interface on the first display device of the first user system, the notification comprising notification data comprising:
            an identification of the second user,
            a user-selectable link to a social network profile maintained in the social networking system for the second user, and
            an indication that the second user is composing the second response to the first feed item concurrent with the first user composing the first response to the first feed item.

2. The system of claim 1, the database system further configurable to cause:
    determining that the composing of the first response by the first user and the composing of the second response by the second user have occurred within a designated timeframe.

3. The system of claim 1, the database system further configurable to cause:
    activating or accessing an instant messaging system configured to send instant messages between the first user system and the second user system; and
    sending of an instant message between the first user system and the second user system, the instant message comprising message content composed by the first user or the second user.

4. The system of claim 1, the database system further configurable to cause:
    receiving, from the second user system, an interrupt request;
    determining, in response to the interrupt request, that the second user is authorized to request an interruption of the composing of the first response by the first user; and
    based on the authorization, suspending or terminating the composing of the first response by the first user.

5. The system of claim 1, the database system further configurable to cause:
    identifying a relationship between the first user and the second user in an organizational hierarchy of an organization with which the first user and the second user are associated;
    determining, based on the relationship, a priority of the first user or the second user in interacting with the first feed item; and
    according to the relationship, suspending or terminating the composing of the first response by the first user.

6. The system of claim 1, the database system further configurable to cause:
    identifying profile data of the second user; and
    sending a further notification to at least one of the first user system or the second user system, the further notification indicating the identified profile data.

7. The system of claim 1, the database system further configurable to cause:
    aggregating feed interaction identification data received from a plurality of user systems, the aggregating comprising updating, at the database system, a database table maintaining the feed interaction identification data.

8. The system of claim 7, the database system further configurable to cause:
compiling a report based on the aggregated feed interaction identification data; and
providing the report to a device over a data network.

9. The system of claim 7, wherein the notification is configured to automatically refresh in response to the aggregation of the feed interaction identification data.

10. A method for using a database system to notify a user that other users of a social networking system are interacting with a feed item of a feed of the social networking system, the method comprising:
receiving, from a first user system of a first user, first interaction data generated at the first user system, the first interaction data indicating that the first user has begun composing a first response to a first feed item of the feed of the social networking system using a first user interface on a first display device of the first user system;
determining, using the database system, that a second user using a second user system has begun composing a second response to the first feed item;
determining, using the database system, that the second user has not yet shared on the feed the second response being composed; and
causing, responsive to the determinations, display of a notification in the first user interface on the first display device of the first user system, the notification comprising notification data comprising:
an identification of the second user,
a user-selectable link to a social network profile maintained in the social networking system for the second user, and
an indication that the second user is composing the second response to the first feed item concurrent with the first user composing the first response to the first feed item.

11. The method of claim 10, further comprising:
determining that the composing of the first response by the first user and the composing of the second response by the second user have occurred within a designated timeframe.

12. The method of claim 10, further comprising:
activating or accessing an instant messaging system configured to send instant messages between the first user system and the second user system; and
causing the sending of an instant message between the first user system and the second user system, the instant message comprising message content composed by the first user or the second user.

13. The method of claim 10, further comprising:
receiving, from the second user system, an interrupt request;
determining, in response to the interrupt request, that the second user is authorized to request an interruption of the composing of the first response by the first user; and
causing, based on the authorization, suspending or terminating the composing of the first response by the first user.

14. The method of claim 10, further comprising:
identifying a relationship between the first user and the second user in an organizational hierarchy of an organization with which the first user and the second user are associated;
determining, based on the relationship, a priority of the first user or the second user in interacting with the first feed item; and
causing, according to the relationship, suspending or terminating the composing of the first response by the first user.

15. A system comprising:
a non-transitory computer-readable medium storing database system software for notifying a user that other users of a social networking system are interacting with a feed item of a feed of the social networking system, the database system software configurable to cause:
processing first interaction data received from a first user system of a first user, the first interaction data indicating that the first user has begun composing a first response to a first feed item of the feed of the social networking system using a first user interface on a first display device of the first user system,
determining that a second user using a second user system has begun composing a second response to the first feed item,
determining that the second user has not yet shared on the feed the second response being composed, and
displaying, responsive to the determinations, a notification in the first user interface on the first display device of the first user system, the notification comprising notification data comprising:
an identification of the second user,
a user-selectable link to a social network profile maintained in the social networking system for the second user, and
an indication that the second user is composing the second response to the first feed item concurrent with the first user composing the first response to the first feed item.

16. The system of claim 15, the database system software further configurable to cause:
determining that the composing of the first response by the first user and the composing of the second response by the second user have occurred within a designated timeframe.

17. The system of claim 15, the database system software further configurable to cause:
activating or accessing an instant messaging system configured to send instant messages between the first user system and the second user system, and
sending of an instant message between the first user system and the second user system, the instant message comprising message content composed by the first user or the second user.

18. The system of claim 15, the database system software further configurable to cause:
determining, in response to an interrupt request received from the second user system, that the second user is authorized to request an interruption of the composing of the first response by the first user, and
based on the authorization, suspending or terminating the composing of the first response by the first user.

19. The system of claim 15, the database system software further configurable to cause:
identifying a relationship between the first user and the second user in an organizational hierarchy of an organization with which the first user and the second user are associated,
determining, based on the relationship, a priority of the first user or the second user in interacting with the first feed item, and according to the relationship, suspending or terminating the composing of the first response by the first user.

\* \* \* \* \*